United States Patent [19]

Mitsutake et al.

[11] Patent Number: 5,446,072
[45] Date of Patent: Aug. 29, 1995

[54] EMULSION COMPOSITIONS FOR FLAMEPROOF FOAM SHEET

[75] Inventors: Tatsuo Mitsutake; Shizuo Narisawa, both of Ichihara, Japan

[73] Assignee: Sumitomo Chemical Co., Ltd., Osaka, Japan

[21] Appl. No.: 339,686

[22] Filed: Nov. 14, 1994

[30] Foreign Application Priority Data

Nov. 16, 1993 [JP] Japan .................. 5-286611

[51] Int. Cl.$^6$ .............................. C08J 9/32
[52] U.S. Cl. ............................ 521/54; 521/65; 521/69; 521/70; 521/71; 521/134; 521/149
[58] Field of Search ........... 521/54, 65, 69, 70, 521/71, 149, 134, 1

[56] References Cited

U.S. PATENT DOCUMENTS 3,663,462  5/1972  Arndt et al. .
3,864,181  2/1975  Wolinski et al. ............. 521/54
4,317,888  3/1982  Wantanabe et al. .......... 521/79

FOREIGN PATENT DOCUMENTS 52-150472  12/1977  Japan .

*Primary Examiner*—Morton Foelak
*Attorney, Agent, or Firm*—Sughrue, Mion, Zinn, Macpeak & Seas

[57] ABSTRACT

An emulsion composition for flameproof foam sheet which comprises components (A)–(C) wherein the amount of component (B) is 5–50 parts by weight per 100 parts by weight of component (A) (based on solid content), and the amount of component (C) is 50–350 parts by weight per 100 parts by weight of component (A) (based on solid content):

(A): An emulsion of ethylene-vinyl ester copolymer which is composed of 5–35% by weight of ($a_1$) ethylene and 95–65% by weight of ($a_2$) vinyl ester and, whose glass transition temperature is $-25°$ C.–$+15°$ C. and toluene-insoluble part is 30% or more by weight;

(B): Thermal expansive hollow micro bead;

(C): Inorganic filler.

The emulsion composition of the invention, which does not contain vinyl chloride-containing copolymer, which generates poisonous chloride gas at the time of disposal by burning, is superior in mechanical strength, crack resistance, water resistance, alkali resistance, blocking resistance, foaming property and embossing property, which are required as the essential properties for foam wall paper, and further superior in flame resistance, and can be used for flameproof foam sheet for wall paper.

15 Claims, No Drawings

EMULSION COMPOSITIONS FOR FLAMEPROOF FOAM SHEET

The invention relates to an emulsion composition for flameproof foam sheet. More particularly, the invention relates to an emulsion composition for flameproof foam sheet which comprises ethylene-vinyl ester copolymer, thermal expansive hollow micro bead and inorganic filler.

Hitherto, emulsion compositions for flameproof foam sheet used for wall paper have maintained their flame resistances with the aid of vinyl chloride-containing copolymer as polymer components.

However, a wall paper which contains vinyl chloride-containing copolymer has a problem from a view point of global environment and work environment in that it generates poisonous chloride gas at the time of disposal by burning.

Consequently, it is desired to develop the emulsion compositions for flameproof foam sheet having good mechanical strength, crack resistance, water resistance, alkali resistance, blocking resistance, foaming property and embossing property, as well as good flame resistance, without using vinyl chloride-containing polymers.

Under the circumstances, the inventors made an extensive study, seeking an emulsion composition for flameproof foam sheet which satisfies all of the above-mentioned properties, and found that an emulsion composition which comprises ethylene-vinyl ester copolymer whose glass transition temperature is in a range from $-25°$ to $+15°$ C. and toluene-insoluble part is 30% or more by weight, and inorganic fillers is superior in mechanical strength, crack resistance, water resistance, alkali resistance, blocking resistance, foaming property and embossing property, and in flame resistance.

Thus, the invention provides an emulsion composition for flameproof foam sheet which comprises the following components (A)-(C) wherein the amount of component (B) is 5-50 parts by weight per 100 parts by weight of component (A) (based on solid content), and the amount of component (C) is 50-350 parts by weight per 100 parts by weight of component (A) (based on solid content):

(A): a water emulsion of ethylene-vinyl ester copolymer which is composed of 5-35% by weight of ($a_1$) ethylene and 95-65% by weight of ($a_2$) vinyl ester and whose glass transition temperature is in a range from $-25°$ to $+15°$ C. and toluene-insoluble part is 30% or more by weight;
(B): thermal expansive hollow micro bead;
(C): inorganic filler.

The invention is explained in detail as follow:

The component (A) of the invention is ethylene-vinyl ester copolymer which is composed of 5-35% by weight of ethylene and 95-65% by weight of ($a_2$) vinyl ester, and whose glass transition temperature is in a range from $-25°$ C. to $+15°$ C. and toluene-insoluble part is 30% or more by weight.

The amount of ($a_1$) ethylene is 5-35% by weight, preferably 10-30% by weight. If the amount is too little, the composition becomes hard and its crack resistance and foaming property become poor. On the other hand, if it is too much, the mechanical strength and blocking resistance become inferior.

As the ($a_2$) vinyl ester, for example, vinyl acetate, vinyl propionate, vinyl butyrate, vinyl pivalate, vinyl laurate, and vinyl versatate are enumerated. Vinyl acetate and vinyl acetate in combination with above-mentioned other vinyl esters are preferred.

The amount of ($a_2$) vinyl ester is 95-35% by weight, preferably 95-65% by weight, particularly preferably 90-70% by weight. If the amount is too little, the mechanical strength and blocking resistance of the composition become poor and if it is too much, the crack resistance and foaming property become inferior.

As the component (A), copolymer composed of 5-35% by weight of ($a_3$) ethylene, 95-35% by weight of ($a_2$) vinyl ester and 30% or less by weight of ($a_3$) (meth)acrylate (total=100% by weight) can preferably be used. By this, the crack resistance, water resistance and durability can be further improved. As the ($a_3$) (meth)acrylate, for example, methyl acrylate, ethyl acrylate, propyl acrylate, butyl acrylate, amyl acrylate, hexyl acrylate, heptyl acrylate, octyl acrylate, 2-ethylhexyl acrylate, decyl acrylate, lauryl acrylate, stearyl acrylate, methyl methacrylate, ethyl methacrylate, propyl methacrylate, butyl methacrylate, amyl methacrylate, hexyl methacrylate, 2-ethylhexyl methacrylate, decyl methacrylate, lauryl methacrylate, and stearyl methacrylate can be enumerated. These may be used alone or in combination thereof.

The amount of ($a_3$) (meth)acrylate is 30% or less by weight, preferably 25% or less by weight of the total weight of the component (A).

Furthermore, the component (A) may contain ($a_4$) functional vinyl monomers under the limit of 10% or less by weight.

The filler dispersibility, composition stability, crack resistance and blocking resistance of the composition can be improved with the ($a_4$) functional vinyl monomers.

As the ($a_4$) functional vinyl monomers, for example, carboxyl group-containing monomers and their anhydrides such as acrylic acid, methacrylic acid, crotonic acid, itaconic acid (including its half ester), maleic acid (including its half ester) and the like; N-methylol derivative monomers such as N-methylol acrylamide, and N-butoxymethyl acrylamide; hydroxy group-containing monomers such as 2-hydroxyethyl acrylate or methacrylate, 2-hydroxypropyl acrylate or methacrylate, mono acrylate or mono methacrylate of polyhydric alcohol and mono allyl ether of polyhydric alcohol; amino group-containing monomers such as dimethylaminoethyl methacrylate, and dimethylaminopropyl acrylamide; epoxy group-containing monomers such as glycidyl acrylate or methacrylate and the like; amide group-containing monomers such as acrylamide, methacryl amide, and maleinamide; sulfonic acid group-containing monomers such as vinyl sodium sulfonate, methacryl sodium sulfonate, and 2-acrylamide-2-methylpropane sodium sulfonate are able to be enumerated.

The component (A) may include copolymerizable crosslinking monomer which has two or more polymerizable double bonds to increase its toluene-insoluble part. The copolymerizable crosslinking monomers which have two or more polymerizable double bonds are, for example, diallyl phthalate, triallyl cyanurate, triallyl isocyanurate, ethylene glycol diacrylate, allyl methacrylate, adipic acid diacrylate, and trimethylolpropane dimethacrylate. The content of this crosslinking monomer is, generally 5% by weight or less, preferably 3% by weight or less of the total weight of the component (A).

In all the above-mentioned cases, the glass transition temperature of the component (A) is −25° C.−+15° C., preferably −20° C.−+10° C. and its toluene-insoluble part must be 30%−100% by weight, preferably 35%−100% by weight, more preferably 40%−100% by weight. If the glass transition temperature is too low, the blocking resistance of the composition becomes inferior, and, on the other hand, if it is too high, the mechanical strength and crack resistance become bad. Further, if the toluene-insoluble part is too small, the water resistance, alkali resistance, foaming property and mechanical strength of the composition become inferior.

Toluene-insoluble part is determined by the method in which 1 g of copolymer film is extracted by 100 g of toluene at 90° C. for 2 hours, and then the amount of insoluble part which is recovered after filtration with 300 mesh net is measured.

The component (A) which is composed of ($a_1$) ethylene and ($a_2$) vinyl ester, if necessary, by adding ($a_3$) (meth)acrylate, and further if necessary, by adding ($a_4$) functional vinyl monomers, is usually obtained by emulsion polymerization in the presence of emulsifiers and protective colloids. As the emulsifiers and the protective colloids used for producing component (A), for example, hydroxyethyl cellulose, nonionic surfactant such as polyoxyehtylene nonylphenyl ether, anionic surfactant such as sodium lauryl sulfate, polyvinyl alcohol whose average degree of polymerization is 200−3000, preferably 250−2500, are enumerated. In particular, polyvinyl alcohol whose average degree of polymerization is 250−2500 is preferred. By the emulsion polymerization, the water resistance, alkali resistance and mechanical strength of the composition used for wall paper can be maintained in higher levels.

The component (B) of the invention is thermal expansive hollow micro bead. The thermal expansive hollow micro bead is a foam agent which is composed of micro bead which can be expanded and foamed by heating, for example, balls with diameter of 1∼50 μm wherein a low boiling point hydrocarbon such as ethane, propane, butane, pentane, hexane, and heptane is contained in cores of polymer such as poly vinylidene chloride, vinylidene chloride-acrylonitrile copolymer, poly acrylonitrile, and acrylonitrile-methyl acrylate copolymer. As the component (B), commercially available products, for example, Trade name "Microsphere" of Matsumoto Yushi Co., is enumerated.

The component (C) of the invention is inorganic filler, for example, aluminium hydroxide, magnesium hydroxide, barium hydroxide, calcium carbonate, magnesium carbonate, calcium sulfate, barium sulfate, ferrous hydroxide, basic zinc carbonate, basic lead carbonate, silica sand, clay, talc, silica, titanium oxide, and magnesium silicate. Among these, aluminium hydroxide, magnesium hydroxide, calcium carbonate, ferrous hydroxide, basic zinc carbonate and basic lead carbonate are preferred.

The contents of the components (A)−(C) of the invention are as follow:

The content of component (B) is 5−50 parts by weight, preferably 10−40 parts by weight, more preferably 10−25 parts by weight, per 100 parts by weight of component (A) (based on solid content), and the content of component (C) is 50−350 parts by weight, preferably 80−300 parts by weight, more preferably 100−250 parts by weight, per 100 parts by weight of component (A) (based on solid content).

If component (B) is too little, the foaming property of the composition becomes inferior, and if component (B) is too much, the mechanical strength is inferior and it is not economical.

And if component (C) is too little, the flame resistance of the composition becomes inferior and on the other hand if component (C) is too much, the foaming property, mechanical strength and crack resistance of the composition are inferior.

The emulsion composition for flameproof foam sheet of the invention is obtained by mixing prescribed amounts of above-mentioned components (A)−(C).

In order to apply an emulsion composition for flameproof foam sheet of the invention for wall paper, for example, the composition of the invention is coated on paper by such coating methods as roll coater, reverse roll coater, and doctor coater, or printed on paper by uneven printing method such as screen printing, gravure printing, carving roll printing, and flexographic printing, and, after drying, for example, foaming treatment by heating 150°−200° C. and embossing processing are performed on the paper for wall paper.

The emulsion composition of the invention, which does not contain vinyl chloride-containing copolymer, is superior in mechanical strength, crack resistance, water resistance, alkali resistance, blocking resistance, foaming property and embossing property, which are required as the essential properties for foam wall paper, and further superior in flame resistance, and can be used for flameproof foam sheet for wall paper.

EXAMPLES

The invention is described in detail by way of examples as follows, however the invention is not limited to these examples.

Examples 1−6 and comparative examples 1−7.

The component (A), the component (B); Microsphere F-85D (Matsumoto Yushi Co.), the component (C); aluminium hydroxide CM-45 (Sumitomo Chemical Co.) shown in table 1 and 30 parts by weight of water are mixed and dispersed with a homo-mixer. A small amount of thickener (Aron A-20L of Toagousei Chemical Company(LTD)) was added to thus-obtained mixture, and viscosity was adjusted to 6000 cps, and thus an emulsion composition for flameproof foam sheet (solid content: 66% by weight) was obtained. The composition was coated on release paper as film thickness of 0.15 mm, dried for 10 min. at 100° C., and foamed by heating at 180° C. for 1 min. Thus-obtained foam body was evaluated as follow, and the results are shown in table 2.

(1) Foaming property

It was evaluated by foaming magnification (=thickness of foam body/thickness of dried film).

(2) Water resistance

Foam body was immersed in water at 20° C. for 24 hours, and its external appearance was observed and evaluated by the standard as ◯ (good: not swelling, non-soluble), Δ (partly swelling), and × (partly solved).

(3) Alkali resistance

Foam body was immersed in 1N NaOH solution at 20° C. for 24 hours and its external appearance was observed and evaluated by the standard as ◯ (good: not swelling, non-soluble), Δ (partly swelling), and × (partly soluble).

(4) Blocking resistance

Each surface of two dry paint films was piled on the same side, and set for 24 hours under load of 5 kg/cm² under the condition of 45° C. and 90% RH (relative humidity). After that two dry paint films were peeled and evaluated by the standard as ◯ (non resistant), Δ (resistant), and × (material breakage).

(5) Crack resistance

Foam body was bent by 180 degrees, its external appearance of the bent position was observed and evaluated by the standard as (3) (no change), Δ (partly cracked), and × (overall cracked).

(6) Mechanical strength

Outside of foam body was rubbed by finger, its external appearance was observed and evaluated by the standard as ◯ (no change), Δ (partly defective), and × (surface of dry paint film was peeled).

(7) Flame resistance

Foam body of 300 mm in length and 30 mm in width was perpendicularly suspended, and heated for 5 sec. from the bottom by burner. Combustion distance (combustion speed) per 1 min. was measured.

TABLE 1

| | Example | | | | | | Comparative Example | | | | | | |
|---|---|---|---|---|---|---|---|---|---|---|---|---|---|
| | 1 | 2 | 3 | 4 | 5 | 6 | 1 | 2 | 3 | 4 | 5 | 6 | 7 |
| Components of compositions parts by weight *5 | | | | | | | | | | | | | |
| (A) ethylene-vinyl ester copolymer | 100 | 100 | 100 | 100 | 100 | 100 | 100 | 100 | 100 | 100 | 100 | 100 | 100 |
| (B) Microsphere F-85D | 20 | 20 | 20 | 20 | 10 | 20 | 20 | 20 | 20 | 20 | 3 | 20 | 80 |
| (C) Alminium hydroxide CM-45 | 100 | 100 | 100 | 100 | 100 | 200 | 100 | 100 | 100 | 100 | 100 | 20 | 100 |
| Component (A) wt % *1 | | | | | | | | | | | | | |
| $a_1$ | 18 | 30 | 20 | 12 | 18 | 30 | 18 | 0 | 15 | 0 | 18 | 18 | 18 |
| $a_2$ | 82 | 70 | 68 | 86 | 82 | 70 | 82 | 100 | 50 | 75 | 82 | 82 | 82 |
| $a_3$ | | | | | | | | | | | | | |
| BA | 0 | 0 | 0 | 0 | 0 | 0 | 0 | 0 | 0 | 0 | 0 | 0 | 0 |
| EHA | 0 | 0 | 10 | 0 | 0 | 0 | 0 | 0 | 35 | 25 | 0 | 0 | 0 |
| MMA | 0 | 0 | 0 | 0 | 0 | 0 | 0 | 0 | 0 | 0 | 0 | 0 | 0 |
| $a_4$ | | | | | | | | | | | | | |
| AA | 0 | 0 | 1 | 0 | 0 | 0 | 0 | 0 | 0 | 1 | 0 | 0 | 0 |
| NMAM | 0 | 0 | 1 | 2 | 0 | 0 | 0 | 0 | 0 | 1 | 0 | 0 | 0 |
| Tg C °C. *2 | 0 | −18 | −18 | +8 | 0 | −18 | 0 | +30 | −30 | 0 | 0 | 0 | 0 |
| TIP wt % *3 | 60 | 65 | 65 | 60 | 60 | 65 | 5 | 60 | 5 | 60 | 60 | 60 | 60 |
| Protective colloid *4 | PVA | PVA | PVA + NON | PVA | PVA | PVA | NON | PVA | HEC + NON | PVA/ NON | PVA | PVA | PVA |

*1
$a_1$: Ethylene.
$a_2$: Vinyl acetate.
BA: n-Butyl acrylate.
EHA: 2-Ethylhexyl acrylate.
MMA: Methyl methacrylate.
AA: Acrylic acid.
NMAM: N-methylol acrylamide.
*2 Tg: Glass transition temperature.
*3 TIP: Toluene-insoluble part.
*4 Protective colloid.
PVA: Polyvinyl alcohol with average degree of polymerization of 1000.
HEC: Hydroxyethyl cellulose.
NON: Nonionic surfactant (polyoxyethylene nonylphenyl ether).
ANI: Anionic surfactant (lauryl sodium sulfate).
*5 Component of compositions: parts by weight per 100 parts by weight of solid part of (A).

TABLE 2

| | Example | | | | | | Comparative Example | | | | | | |
|---|---|---|---|---|---|---|---|---|---|---|---|---|---|
| | 1 | 2 | 3 | 4 | 5 | 6 | 1 | 2 | 3 | 4 | 5 | 6 | 7 |
| Evaluation | | | | | | | | | | | | | |
| Foaming property | 6.5 | 6.3 | 6.3 | 6.5 | 5.6 | 6.1 | 4.8 | 3.5 | 3.8 | 4.8 | 1.6 | 6.6 | 7.0 |
| Water resistance | ◯ | ◯ | ◯ | ◯ | ◯ | ◯ | Δ | Δ | ◯ | ◯ | ◯ | ◯ | ◯ |
| Alkali resistance | ◯ | ◯ | ◯ | ◯ | ◯ | ◯ | Δ | Δ | ◯ | Δ | ◯ | ◯ | ◯ |
| Blocking resistance | ◯ | ◯ | ◯ | ◯ | ◯ | ◯ | ◯ | ◯ | × | × | ◯ | ◯ | ◯ |
| Crack resistance | ◯ | ◯ | ◯ | ◯ | ◯ | ◯ | ◯ | × | ◯ | Δ | ◯ | ◯ | Δ |
| Mechanical strength | ◯ | ◯ | ◯ | ◯ | ◯ | ◯ | Δ | × | Δ | ◯ | ◯ | ◯ | × |
| Combustion speed mm/min. | 75 | 70 | 70 | 72 | 74 | 52 | 80 | 105 | 100 | 110 | 72 | >300 | 80 |

What is claimed is:

1. An emulsion composition for a flameproof foam sheet which comprises the following components (A)–(C) and wherein an amount of component (B) is 5–50 parts by weight per 100 parts by weight of component (A) (based on solid content), and an amount of component (C) is 50–350 parts by weight per 100 parts by weight of component (A) (based on solid content):

(A): an emulsion of an ethylene-vinyl ester copolymer which is composed of 5–35% by weight of ($a_1$) ethylene and 95–65% by weight of ($a_2$) vinyl ester and, which has a glass transition temperature in a range from −25° C. to +15° C. and a toluene-insoluble part is 30% or more by weight;

(B): a thermal expansive hollow micro bead; and (C): an inorganic filler.

2. An emulsion composition of claim 1, wherein the said component (A) contains 30% by weight or less of ($a_3$) (meth)acrylate in addition to ($a_1$) ethylene and ($a_2$) vinyl ester.

3. An emulsion composition of claim 2, wherein the said component (A) contains 10% by weight or less of ($a_4$) functional vinyl monomer in addition to ($a_1$) ethylene, ($a_2$) vinyl ester and ($a_3$) (meth)acrylate.

4. An emulsion composition for a flameproof sheet which contains the following components (A)–(C) and in which an amount of component (B) is 10–40 parts by weight per 100 parts by weight of component (A) (based on solid content), and an amount of component (C) is 80–300 parts by weight per 100 parts by weight of component (A) (based on solid content):

(A): an emulsion of an ethylene-vinyl ester copolymer which is composed of 5–35% by weight of ($a_1$) ethylene and 95–65% by weight of ($a_2$) vinyl ester and, which has a glass transition temperature in a range from $-20°$ C. to $+10°$ C. and a toluene-insoluble part is 35% or more by weight;

(B): a thermal expansive hollow micro bead; and (C): an inorganic filler.

5. The composition of any one of claims 1 to 4 wherein the vinyl ester is selected from the group consisting of vinyl acetate, vinyl propionate, vinyl butyrate, vinyl pivalate, vinyl laurate, vinyl versatate and a mixture thereof.

6. The composition of any of claims 1 to 4 wherein the component (A) is a water emulsion of ethylene-vinyl ester copolymer obtained by emulsion polymerization with protective colloids and emulsifiers.

7. The composition of claim 6, wherein the protective colloid and emulsifiers are selected from the group consisting of hydroxyethyl cellulose, a nonionic surfactant, an anionic surfactant, and polyvinyl alcohol with an average degree of polymerization of 200–3000.

8. The composition of claim 7, wherein the protective colloid is selected from the group consisting of hydroxyethyl cellulose, polyoxyethylene nonylphenyl ether, sodium lauryl sulfate, and polyvinyl alcohol with the average degree of polymerization of 200–3000.

9. The composition of claim 8 wherein the protective colloid is polyvinyl alcohol with average degree of polymerization of 200–3000.

10. The composition of claim 9 wherein the protective colloid is polyvinyl alcohol with average degree of polymerization of 250–2500.

11. The composition of any one of claims 1 to 4 wherein the component (B) is thermal expansive hollow micro bead with diameter 1–50 $\mu$m wherein a low boiling point hydrocarbon is contained in cores of a polymer selected from the group consisting of polyvinylidene chloride, vinylidene chloride-acrylonitrile copolymer, polyacrylonitrile and acrylonitrile-methyl acrylate copolymer.

12. The composition of claim 11 wherein the low boiling point hydrocarbon is selected from the group consisting of ethane, propane, butane, pentane, hexane and heptane.

13. The composition of any one of claims 1 to 4 wherein the component (C) is the inorganic filler selected from the group consisting of aluminium hydroxide, magnesium hydroxide, barium hydroxide, calcium carbonate, magnesium carbonate, calcium sulfate, barium sulfate, ferrous hydroxide, basic zinc carbonate, basic lead carbonate, silica sand, clay, talc, silica, titanium oxide and magnesium silicate.

14. The composition of claim 13 wherein the component (C) is the inorganic filler selected from the group consisting of aluminium hydroxide, magnesium hydroxide, calcium carbonate, magnesium carbonate, ferrous hydroxide, basic zinc carbonate and basic lead carbonate.

15. The flameproof foam sheet obtained by heating and foaming the composition of any one of claims 1 to 4.

* * * * *